W. F. HARTIG, DEC'D.
H. W. HARTIG, ADMINISTRATOR.
ADJUSTABLE SUBSOIL ATTACHMENT FOR PLOWS.
APPLICATION FILED AUG. 27, 1912.
1,099,877. Patented June 9, 1914.
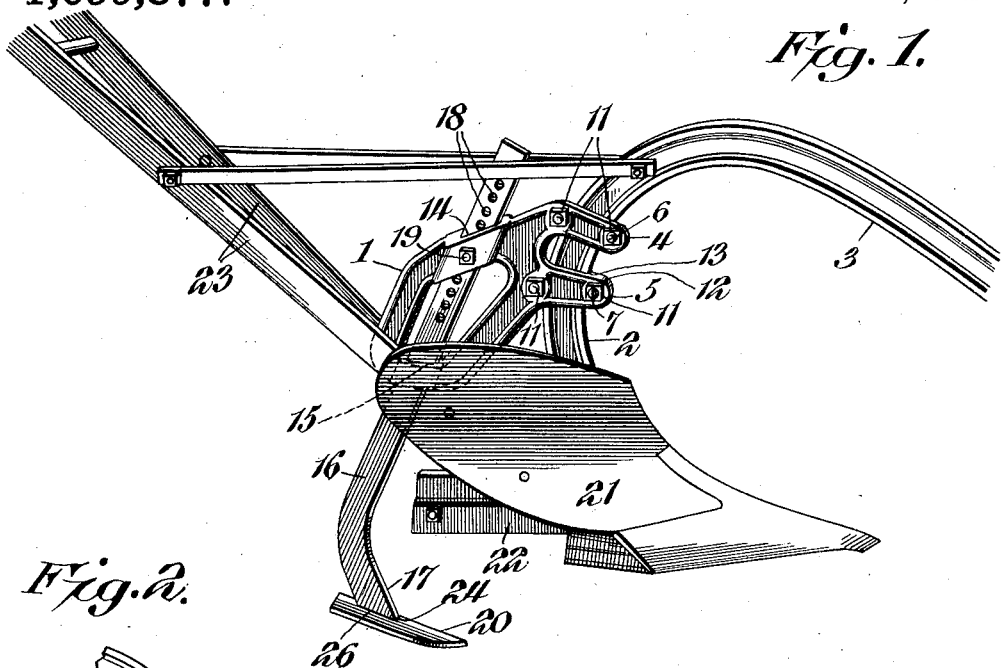
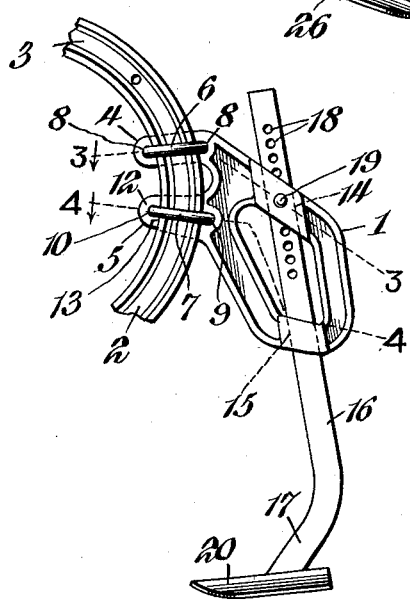
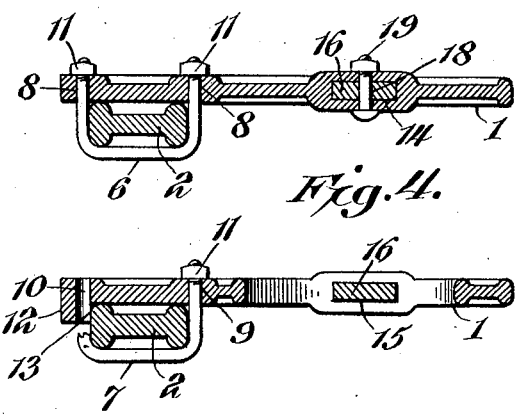
WITNESSES
William F. Hartig, INVENTOR
BY
ATTORNEY

UNITED STATES PATENT OFFICE.

WILLIAM F. HARTIG, OF EVANSVILLE, INDIANA; HENRY W. HARTIG, ADMINISTRATOR OF SAID WILLIAM F. HARTIG, DECEASED, ASSIGNOR TO ALBERT W. AND EDWARD G. HARTIG, OF EVANSVILLE, INDIANA.

ADJUSTABLE SUBSOIL ATTACHMENT FOR PLOWS.

1,099,877.　　　　　Specification of Letters Patent.　　　Patented June 9, 1914.

Application filed August 27, 1912. Serial No. 717,301.

*To all whom it may concern:*

Be it known that I, WILLIAM F. HARTIG, a citizen of the United States, residing at Evansville, in the county of Vanderburg and State of Indiana, have invented a new and useful Adjustable Subsoil Attachment for Plows, of which the following is a specification.

The invention relates to an adjustable subsoil attachment for plows.

The object of the present invention is to provide a simple, inexpensive and efficient subsoil attachment, adapted to be readily applied to a plow without necessitating any alteration in the construction thereof, and capable of ready adjustment to enable it to be arranged in the desired position with relation to the plow and of being securely retained in its adjustment.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a perspective view of a subsoil attachment, constructed in accordance with this invention, and shown applied to a plow. Fig. 2 is an elevation showing the opposite side of the subsoil attachment and a portion of the beam of the plow. Fig. 3 is a sectional view on the line 3—3 of Fig. 2. Fig. 4 is a similar view on the line 4—4 of Fig. 2.

Like numerals of reference designate corresponding parts in all the figures of the drawing.

In the accompanying drawing in which is illustrated the preferred embodiment of the invention, the subsoil attachment comprises in its construction a supporting bracket consisting of an open approximately oblong frame 1, extending rearwardly and downwardly from the downwardly curved rear portion or standard 2 of a plow beam 3, and provided at the front with spaced upper and lower forwardly projecting attaching arms 4 and 5, fitted against the moldboard side of the rear portion or standard 2 of the beam 3 and secured to the same by upper and lower U-bolts 6 and 7. The supporting bracket, which may be constructed of any suitable material, is preferably made of flanged or ribbed metal, as shown. The U-bolts, which embrace the downwardly extending portion 2 of the standard, extend through spaced perforations 8, 9 and 10 of the attaching arms and have threaded terminals equipped with nuts 11. The lower attaching arm is provided at its front end with a laterally projecting enlargement 12 presenting an approximately vertical shoulder 13 to the front edge of the downwardly extending rear portion 2 of the plow beam and adapted to relieve the bolts of strain. The perforation 10 at the front end of the lower attaching arm extends through the lateral enlargement 12, which does not extend entirely across the front edge of the portion 2 of the beam to enable the latter to be directly engaged by the lower U-bolt, but the lateral enlargement may, of course, be made of any desired size.

The downwardly and rearwardly extending frame 1, which is composed of spaced top and bottom portions and front and rear inclined connecting portions, is provided at the top and bottom portions with alined openings 14 and 15 for the reception of a standard 16, extending downwardly and rearwardly at a slight inclination and having a downwardly and forwardly curved foot portion 17. The front attaching arms extend forwardly from the front connecting portion of the frame and the upper and lower portions of the frame extend rearwardly from the said connecting portion, which is located at an intermediate point between the front and rear ends of the bracket. The standard 16, which snugly fits the upper and lower openings 14 and 15, is rigidly supported by the bracket, and it is provided at its upper portion with a series of perforations 18 for the reception of a transverse bolt 19, piercing the side walls of the upper opening 14 and securing the standard in its adjustment. The standard is adapted to be raised and lowered to arrange a subsoil blade 20 in the proper position with relation to the plow. The frame of the bracket and the standard are arranged in rear of the plow beam at the space between the moldboard 21 and the landside 22 of the plow and they preferably extend between the plow handles 23.

No claim is made in this application to the means for securing the subsoil blade to the subsoil standard, as this forms the subject-matter of a divisional application.

What is claimed is:—

1. The combination with a plow including a downwardly extending standard, of a subsoil attachment comprising a bracket provided at the front with means for securing it to the plow standard and having spaced upper and lower rearwardly extending portions, the latter being provided with alined inclined openings located in different transverse planes, a subsoil standard secured in the said openings, and a subsoil blade carried by the subsoil standard.

2. A subsoil attachment for plows comprising a supporting bracket provided at the front with spaced upper and lower forwardly extending arms adapted to fit against one side of the rear portion of a plow beam, fastening means carried by the said arms for securing them to the said beam, one of the arms being provided at the front with a laterally extending shoulder to fit against the front edge of the rear portion of the plow beam to relieve the said fastening means of strain, a standard mounted on the supporting bracket, and a subsoil blade carried by the lower end of the standard.

3. A subsoil attachment for plows including a supporting bracket consisting of an open substantially oblong frame provided with spaced upper and lower inclined openings and having forwardly extending attaching arms projecting from the upper portion of the frame at the front thereof, said arms being arranged at an obtuse angle to the frame so that the latter will depend from the said arms in an inclined position, means for securing the attaching arms to the rear portion of the beam of a plow, a standard passed through and adjustably mounted in the upper and lower openings of the said frame, and a subsoil blade carried by the lower end of the standard.

4. A subsoil attachment for plows including a supporting bracket formed in a single piece and consisting of a substantially oblong frame open in the center and having its upper and lower arms formed with inclined vertical openings which are in alinement, said bracket being provided with a forwardly extending attaching portion having spaced fastening means, said attaching portion being arranged at an obtuse angle to said frame, whereby when the said attaching portion is secured to a plow standard the frame will depend in an inclined position from the said attaching portion at the rear end of the plow standard and in spaced relation thereto, a standard passed through the openings of the frame, means for securing the standard to the frame, and a blade carried by the standard.

In testimony that I claim the foregoing as my own, I have hereto affixed my signature in the presence of two witnesses.

WILLIAM F. HARTIG.

Witnesses:
BEN TILLMAN,
ROBERT SCHWANER.

---

Copies of this patent may be obtained for five cents each, by addressing the "Commissioner of Patents, Washington, D. C."